(12) United States Patent
Allen et al.

(10) Patent No.: US 12,188,456 B2
(45) Date of Patent: *Jan. 7, 2025

(54) PLASMA ENGINE WITH LEPTONIC ENERGY SOURCE

(71) Applicant: Lockheed Martin Corporation, Bethesda, MD (US)

(72) Inventors: Edward Henry Allen, Bethesda, MD (US); Luke Alexander Uribarri, Arlington, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 217 days.

This patent is subject to a terminal disclaimer.

(21) Appl. No.: 17/941,078

(22) Filed: Sep. 9, 2022

(65) Prior Publication Data

US 2023/0003203 A1 Jan. 5, 2023

Related U.S. Application Data

(63) Continuation of application No. 17/072,574, filed on Oct. 16, 2020, now Pat. No. 11,473,569.

(60) Provisional application No. 62/926,253, filed on Oct. 25, 2019.

(51) Int. Cl.
 *F03H 1/00* (2006.01)
(52) U.S. Cl.
 CPC ................. *F03H 1/0081* (2013.01)

(58) Field of Classification Search
 CPC ............................ B64G 1/408; F03H 1/0081
 See application file for complete search history.

(56) References Cited

U.S. PATENT DOCUMENTS

| | | | |
|---|---|---|---|
| 6,449,941 B1 | 9/2002 | Warboys et al. | |
| 7,509,795 B2 | 3/2009 | Allen | |
| 11,473,569 B2 * | 10/2022 | Allen | H05H 1/54 |
| 2009/0229240 A1 | 9/2009 | Goodfellow | |
| 2018/0266403 A1 | 9/2018 | Hey et al. | |
| 2018/0310393 A1 | 10/2018 | Castillo Acero et al. | |

OTHER PUBLICATIONS

Antonelli, Paolo et al., "A Model Of Synchronization Over Quantum Networks," arXiv:1702.00041v1 [math.AP], 19 pages, Jan. 31, 2017.
Aprahamian, Ani et al., "Long Live Isomer Research," Nature Physics, vol. 1, pp. 81-82, Nov. 2005.
Bambynek, W. et al., "Orbital Electron Capture By The Nucleus," Rev. Mod. Phys., vol. 49, Iss. 1, 547 pages, Jan. 1977.
Baring, Matthew G., "Diffusive Shock Acceleration: The Fermi Mechanism," arXiv:astro-ph/9711177v1, 10 pages, Nov. 16, 1997.
(Continued)

*Primary Examiner* — Arun Goyal
*Assistant Examiner* — William L Breazeal

(57) ABSTRACT

Provided herein are various leptonic power sources, leptonic control systems, and leptonic-powered engines. An apparatus includes a leptonic source configured to emit beam electrons to ionize a material into a plasma according to a selectable ionization degree and deposit charge onto a plurality of cathodes in a progressively more negatively charged arrangement to establish an electric field of a selectable intensity in the plasma.

20 Claims, 7 Drawing Sheets

(56) References Cited

OTHER PUBLICATIONS

Baughman, Jack A. et al., "Magnetohydrodynamics Accelerator Research Into Advanced Hypersonics (MARIAH)," NASA, CR-97-206242/PT1, 637 pages, Oct. 1997.
Brogan, Thomas R., "The 20MW LORHO MHD Accelerator For Wind Tunnel Drive; Design, Construction And Critique," 30th Plasmadynamics and Lasers Conference, 16 pages, Jun. 28-Jul. 1, 1999.
Cole, John et al., "Rocket-Induced Magnetohydrodynamic Ejector—A Single-Stage-To-Orbit Advanced Propulsion Concept," AIAA 1995 Space Programs and Technologies Conference, 13 pages, Sep. 26-28, 1995.
DARPA, Broad Agency Announcement for "Demonstration Rocket For Agile Cislunar Operations (DRACO)," HR001120S0031, 39 pages, May 15, 2020.
Drury, L. O'C, "An Introduction To The Theory Of Diffusive Shock Acceleration Of Energetic Particles In Tenuous Plasmas," Rep. Prog. Phys., vol. 46, pp. 973-1027, 1983.
Emery, G. T., "Perturbation Of Nuclear Decay Rates," Annu. Rev. Nucl. Sci., vol. 22, pp. 165-202, 1972.
Hartouni, E. P. et al., "Theoretical Assessment Of 178m2Hf De-Excitation," Lawrence Livermore National Laboratory, LLNL-TR-407631, 110 pages, Oct. 9, 2008.
Helmer, R. G. et al., "Be," Table of Radionuclides (vol. 1—A=1 to 150), 5 pages, 2004.
IAEA, "Accelerator Driven Systems: Energy Generation And Transmutation Of Nuclear Waste Status Report," IAEA-TECDOC-985, 479 pages, Nov. 1997.
International Application No. PCT/US2020/057194, International Search Report, Written Opinion, 8 pages, Jan. 28, 2021.
Jahn, Robert G., "Physics Of Electric Propulsion," 182 pages, 1968.
Litz, M. S. et al., "Controlled Extraction Of Energy From Nuclear Isomers," Proceedings for the Army Science Conference (24th), 7 pages, Nov. 29-Dec. 2, 2005.
Loveland, Walter et al., "Chapter 3—Radioactive Decay Kinetics," Modern Nuclear Chemistry, 37 pages, 2006.
De Mendoza, Ignacio Hermoso et al., "Synchronization In A Semiclassical Kuramoto Model," Physical Review E, vol. 90, pp. 052904-1-052904-12, Nov. 4, 2014.
Miley, George H., "Direct Conversion Of Nuclear Radiation Energy," 534 pages, 1970.
O'Hara, J., "Energy Of Knots And Conformal Geometry," World Scientific, 2 pages, Apr. 17, 2003.
Ohtsuki, T. et al., "Enhanced Electron-Capture Decay Rate Of 7Be Encapsulated In C60 Cages," Physical Review Letters, vol. 93, No. 11, pp. 112501-1-112501-4, Sep. 9, 2004.
Pereira, N. R. et al., "Economics Of Isomeric Energy," Laser Physics, vol. 17, No. 6, pp. 874-879, 2007.
Prelas, Mark A. et al., "A Review Of Nuclear Batteries," Progress in Nuclear Energy, 122 pages, Aug. 2014.
Ramirez, Jonatan Pena et al., "The Sympathy Of Two Pendulum Clocks: Beyond Huygens' Observations," Scientific Reports, 16 pages, Mar. 29, 2016.
Schmookler, B. et al., "Modified Structure Of Protons And Neutrons In Correlated Pairs," Nature, vol. 566, Iss. 7744, 22 pages, Feb. 2019.
Taub, J. M., "A Review Of Fuel Element Development For Nuclear Rocket Engines," Los Alamos Scientific Laboratory, UC-33, 50 pages, Jun. 1975.
Taylor, Geoffrey, "The Formation Of A Blast Wave By A Very Intense Explosion—I. Theoretical Discussion," Proceedings of the Royal Society of London, Series A, Mathematical and Physical Sciences, vol. 201, Iss. 1065, pp. 159-174, Mar. 1950.
United States Air Force, "Science and Technology Strategy," 30 pages, Apr. 2019.
Walker, Philip M. et al., Preprint for "Nuclear Isomers: Recipes From The Past And Ingredients For The Future," Nuclear Physics, News 17, No. 2, 9 pages, 2007.
Wikipedia, "Electron Capture," 4 pages, Jan. 16, 2017.
Wikipedia, "Hafnium Controversy," 4 pages, Sep. 25, 2020.
Wikipedia, "Inertial Confinement Fusion," 12 pages, Oct. 10, 2019.
Witthaut, Dirk et al., "Classical Synchronization Indicates Persistent Entanglement In Isolated Quantum Systems," Nature Communications, 7 pages, Apr. 12, 2017.

\* cited by examiner

PLASMA ENGINE WITH LEPTONIC ENERGY SOURCE

RELATED APPLICATIONS

This application is a continuation of, and claims priority to, U.S. patent application Ser. No. 17/072,574, titled "PLASMA ENGINE WITH LEPTONIC ENERGY SOURCE," filed Oct. 16, 2020. This application hereby claims the benefit of and priority to U.S. Provisional Patent Application No. 62/926,253, titled "PLASMA FUEL ENGINE," filed Oct. 25, 2019, which is hereby incorporated by reference in its entirety.

TECHNICAL BACKGROUND

Propulsive engines can take various forms and be supplied using fuels that include chemical, electrical, nuclear, and other types. Engines fueled by chemical reactions, such as turbine (jet) engines or other combustion engines, require a substantial positive temperature differential between inlet air and exhaust gas. As a jet engine accelerates, especially above Mach 1, the temperature of the inlet air rises rapidly while the temperature of the exhaust gas rises more slowly, so the temperature differential diminishes. Eventually the temperature differential is extinguished, and no positive work or thrust can be produced by the engine. This happens at Mach 4 or so for a conventional turbine. One approach to higher speed attempts to avoid the inlet air temperature rise by compressing and decelerating the flow less and running the combustion process at supersonic speed. This approach is embodied in the supersonic combustion ram jet (scram jet). Compression is required to generate work, so the scram jet delays the onset of zero thrust to higher speed (Mach 8-10 range).

Electric propulsion adds energy from an external source to establish thrust. The specific impulse of electric propulsion can be large in comparison with chemical propulsion where the specific impulse is limited by the energy available from chemical reactions. In practice, the specific impulse is limited by the particular implementation. Since thrust will decrease as the specific impulse increases for a given power, a tradeoff must be made for a particular mission between propellant usage and mission time. High specific impulse leads to low propellant usage.

There are three main types of electric thrusters: electrothermal, electromagnetic, and electrostatic. Electrothermal thrusters are similar to standard chemical rocket engines in that heat energy is added to a working fluid in a confined volume, raising its pressure, but differ in that the heat is produced by electrical means (often an electrical discharge). The gas is subsequently expanded through a converging-diverging nozzle to achieve thrust just as in chemical rockets. There are a variety of electromagnetic thruster configurations, but all depend on generating a thrust by accelerating particles in a particular direction relative to both the electric and magnetic fields in the plasma. For example, the pulsed plasma microthruster (PPT) utilizes a spark discharge across a block of TEFLON® to create plasma, which is accelerated outward by induced azimuthal current interacting with a radial magnetic field. In a Hall thruster, an axial electric field provided in a radial magnetic field creates an azimuthal Hall current, which accelerates plasma axially producing thrust. In the self-field magnetoplasmadynamic (MPD) thruster, the current flow creates its own magnetic field in which a force accelerates the plasma flow radially and axially. This can only occur if the current and hence the power are high, often necessitating pulsed operation at lower average powers. Electrostatic thrusters accelerate charged particles in an electric field, without an applied magnetic field. A linear accelerator, such as the one installed at the Stanford University Linear Accelerator Center (SLAC) is an example of an electrostatic thruster, though it is not used for the production of thrust.

Electromagnetic thrusters have much higher specific impulse than electrothermal thrusters. Electromagnetic thrusters are more compact than electrostatic ion thrusters because a charge neutral plasma does not have a space charge limitation on density. Problems include electrode erosion and general complexity of flow and current fields. The PPT thruster is mature and simple but does not scale up to large powers.

Electrostatic ion thrusters use a set of grids to accelerate charged ions. Electrons are also expelled separately to maintain charge neutrality and prevent a charge buildup which could shut off the ion beam. Heavy gases such as mercury vapor and xenon have been used to reduce ionization losses as a fraction of total energy. Ionization losses are approximately the same for most gases, whereas for a given exhaust velocity the energy added per ion is greater for heavier gases. In electrostatic thrusters, the beam consists of ions only and repulsion between particles limits the maximum density to relatively low levels, sometimes called the "space charge effect". The space charge effect limits electrostatic thrusters to significantly lower thrust than other types of electric thrusters.

Consequently, there is no chemical-fuel based airbreathing propulsion system that can enable hypersonic flight in the range above Mach 10 or so and up to orbital speed. The range above Mach 10 is important because it would provide access to orbit without a rocket vehicle. A rocket capable of reaching the moon will typically have a fuel mass fraction of 90%+; of that fuel mass, 85% will be oxidizer. An airbreathing engine would permit most of the oxidizer mass to be left off the vehicle.

Flight in low earth orbit, denominated in energy terms, is about $3.2*10^4$ J/g (assumes 8 km/s is orbit). LH/LOX combustion yields about $1.27 \; 10^4$ J/g (NIST heat of formation of gaseous water)—so a fuel mass roughly 2.5 times the payload mass is required to place a payload in orbit. More energy is needed out of the fuel burn to improve this ratio. Improving performance of propulsion systems is typically limited by the energy intensity of the fuel, and applies to most propulsion systems, whether rockets, jets, scramjets, bypass turbines, and the like. Fuels are limited in intensity by the energy (power) per unit mass (J/g) that can be released from them which, in turn, is proportional to the strength (energy) of the bonds holding their components together. Chemical fuels harvest the energy of molecular bonds and thus are limited to less than $10^5$ J/g, leading to a performance limit of, for example, rockets at about 500 seconds $I_{SP}$ (specific impulse). Nuclear fuels harvest either the weak force bonding energies (referred to as leptonic fuels) that roughly range between $10^5$ J/g and $10^{10}$ J/g, or strong force nuclear bonds that range above those energies. Nuclear power reactors and nuclear weapons are familiar examples of strong gluon bond energy harvesting. Various forms of "beta" batteries (nuclear batteries) are examples of power sources harvesting weak force bond energies.

OVERVIEW

The description herein provides improvements to the performance of engine systems, propulsion systems, and associated power sources for such systems. Discussed herein are leptonic fuels, a-thermal propulsion, and direct use of leptonics. Leptonic fuels or "leptonics" enable specific impulse ($I_{SP}$) levels of tens of thousands of seconds and higher. Leptonics are capable of specific impulse levels higher than what is optimal for reaction propulsion systems (i.e. thrusters rooted in Newton's third law entailing gas flows), so some dilution of the leptonic fuel flow with a working fluid derived from non-fuel supplies can be employed. This working fluid may be harvested from external sources, such as when flying in an atmosphere, or can be provided from on board stores of propellant material. The engine or propulsion systems discussed herein are considered as a type of plasma fuel engines (PFE). Thus, the $I_{SP}$ of a PFE with leptonic enhancement is throttleable and controllable to meet various flight and mission requirements. The terms anode and cathode, as used herein, might be interchanged in certain perspectives.

Provided herein are various leptonic power sources, leptonic control systems, and leptonic-powered engines. An apparatus includes a leptonic source configured to emit beam electrons to ionize a material into a plasma according to a selectable ionization degree and deposit charge onto a plurality of cathodes in a progressively more negatively charged arrangement to establish an electric field of a selectable intensity in the plasma.

Another example includes a method comprising controllably emitting electrons from a leptonic source to ionize a material and deposit charge onto a plurality of cathodes as having progressively more negative charge to establish an electric field in the material and produce a selectable ionization degree of the material and a selectable intensity of the electric field.

Yet another example includes a leptonic source comprising a containment structure configured to hold isotope ions in a state in which electron capture decay is below a threshold probability. The leptonic source also includes a control element configured to selectively induce prompt electron capture decay of a selected portion of the isotope ions to produce gamma radiation for impingement onto a target material and liberation of electrons from the target material. The target material is configured to emit the electrons into a chamber to ionize a gas into a plasma according to a selectable ionization degree and deposit charge onto a plurality of cathodes in a progressively more negatively charged arrangement to establish an electric field of a selectable intensity, wherein the selected portion of the isotope ions is controlled to achieve the selectable ionization degree and the selectable intensity of the electric field.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
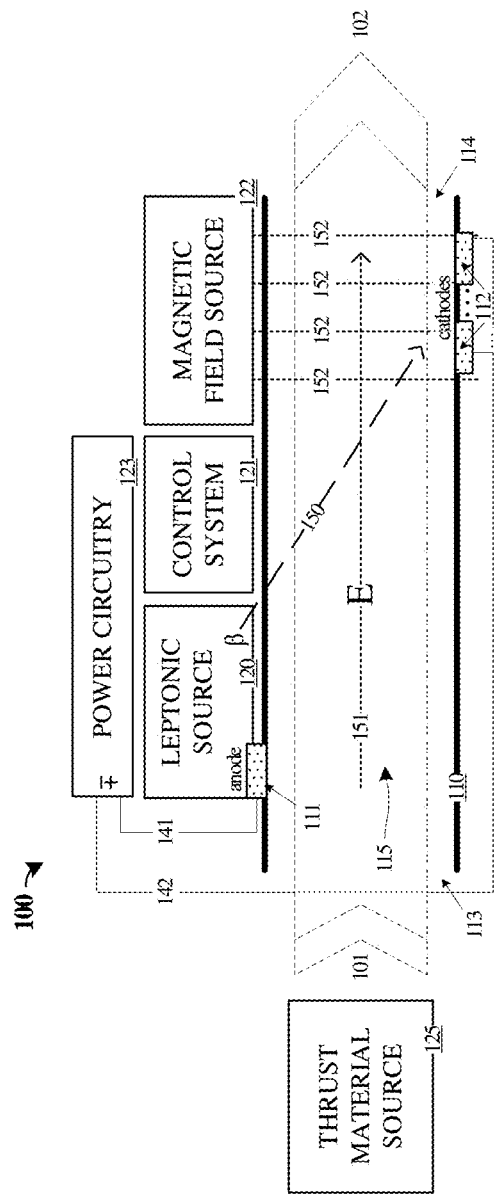
FIG. 1 illustrates a plasma fuel engine in an implementation.

The description herein provides improvements to the performance of engine systems, propulsion systems, and associated power sources for such systems. Discussed herein are leptonic fuels, a-thermal propulsion, and direct use of leptonics. Distinct from fission or fusion, a special class of nuclear decay interactions is called beta decay. Nuclear beta decay occurs in three ways, beta−, beta+, and EC (electron capture). In these decays, a nuclear neutron (or proton) changes into a nuclear proton (or neutron) with the ejection of neutrinos and electrons (or positrons). Leptonic fuels are distinguishable from chemical fuels and from 'hadronic' fuels of fission, fusion, and related concepts. Leptonic fuels or "leptonics" enable specific impulse ($I_{SP}$) levels of tens of thousands of seconds and higher.

In one example of leptonic fuels, nuclear isomers can be employed for energy storage. Although a naturally stable isomer state might be employed, the examples herein can employ forced stability in isomers by blocking accessible decay pathways with an engineered solution. A trigger energy describes the energy required to trigger prompt decay of an isomer, where prompt decay indicates a decay which follows closely in time from when commanded by a triggering system. This prompt decay can achieve usable energy from the gamma/beta decay scheme and improves the effectiveness of a propulsion cycle described herein by at least creating more ions per decay and more electrons to charge a corresponding electric field. Thus, the approach described herein, in effect, recycles the trigger energy, eliminating it as an energy cost. The engine systems described herein advantageously releases no external radiation, leaves no radioactive residue (e.g. fallout). Moreover, the engine systems described herein can be completely inert in an anomalous flight incident or, in a worst case, if all the leptonic fuel were released freely into the environment, 95% would revert to decay via neutrino release (which is harmless) and a remainder would decay to inert isotopes in a year or less.

Leptonic fuels can be employed in lieu of chemical or hadronic fuels. Hadronic fuels are advantageous in some respects but because of their ultra-high intensity, hadronic fuels produce hard radiation and radioactive residues (fallout) that are difficult to manage with respect to environmental and public health impacts. To mitigate these potentially adverse impacts, hadronic fuels incur generous amounts of overhead in the form of shielding, and other protective and prophylactic gear that adds mass and complexity to the system, diminishing, or even eliminating, the potential benefit of high-intensity fuel. Leptonics, however, operate in a range where fuel intensities and, thus, system performances are improved by orders of magnitude, but not so much as to produce the undesirable consequences or incur the countervailing penalties in mass and complexity.

Leptonics offer a mass flow per unit of power produced consistent with a high specific impulse, and the mass flow of spent leptonic material is such that the velocity required to achieve target thrust levels is beyond what a fluid flow system can typically achieve. Thus, augmentation of the mass flow with inert material is employed in the engine and propulsion systems discussed herein. Leptonics are theoretically capable of specific impulse levels higher than what is optimal for reaction propulsion systems (i.e. thrusters rooted in Newton's third law entailing gas flows), so some dilution of the leptonic fuel flow with a working fluid derived from non-fuel supplies can be employed. This working fluid may be harvested from external sources, such as when flying in an atmosphere, or can be provided from on board stores of propellant material. The engine or propulsion systems discussed herein are considered as a type of plasma fuel engines (PFE). Thus, the $I_{SP}$ of a PFE with leptonic enhancement is throttleable and controllable to meet various flight and mission requirements. However, there are two technical challenges with leptonics. First, leptonics must be rendered stable (radiologically inert) for transport and ground handling when not being used. One way to ensure stable or inert leptonic power sources during storage and transport is to employ isotopes that decay only by electron capture and deny those isotopes access to electrons by storing as bare ions (i.e. stripped of all atomic electrons) and confined in a "magnetic bottle" such as a ion storage ring of ion trap. A second challenge is a mechanism for throttling or triggering of decay processes. The leptonic fuel is released from a suitable storage system and controlled to release corresponding energy on demand. The examples herein trigger prompt decay to regulate the burn rate and thus the power output from the leptonic fuel.

An "a-thermal" engine concept includes engines that are not strictly "heat engines" even if they produce some heat, provided the universal gas law (UGL), PV=nRT, is not the underlying prime principle. Chemical fuel engines all depend on UGL cycles (e.g., Brayton or Otto cycle, Sterling Engines, etc. . . . ) where the working fluid is heated directly or indirectly by combustion (or other heating concept) in a containment (e.g., "combustion chamber") which leads to an increase in pressure followed by an expansion through a nozzle, generating mechanical energy which is then harvested as thrust according to conservation of momentum. While still employing conservation of momentum to generate thrust, plasma propulsion systems do not rely of the UGL, but generate acceleration of the working fluid directly by electromagnetic acceleration fields which do not require heating with compression. While plasma propulsion systems do shed some heat from various sources of inefficiency, the amounts can be relatively small A-thermal acceleration of working fluid is employed with leptonic fuels as energy intensity is great enough that usage of leptonics in heat engines would exceed the temperature and pressure limits of structural materials available to build devices capable of using the energy intensity. Moreover, to achieve acceptable augmentation of the leptonic mass flow in a heat-style engine by stored or harvested working fluid would force so much growth in engine size and weight as to reduce the benefit of leptonic fuel at the system level. Put somewhat differently, heat engines put too much of the available energy into the engine in the form of heat and, thus, cannot be built to use high intensity fuels without compromising performance at the system level, reducing the benefit of leptonic energy intensity. Leptonic-fueled engines discussed herein are primarily a-thermal in nature. The plasma fuel engine (PFE) incorporates an a-thermal accelerator of working fluids or materials. PFE devices rely on the working material to be partially ionized and, to generate acceleration of the partially ionized material, employ both an electric and a magnetic field to operate in one of two modes (or a mixture of both). These two modes include a magnetoplasmadynamic (MPD) mode or a Hall thruster mode. Other modes include a reverse operation to provide electric power generation. These PFE devices require no heating or compression of the working material when operating at the highest efficiency (e.g. $I_{SP}$>chemical limit), but PFE devices are not perfectly efficient and some heating occurs and incurs losses. PFE devices are often considered electrical propulsion devices and use electrical power typically for two purposes. First, to at least partially ionize the working material into a plasma and to maintain that ionization level of the material during the acceleration run. Second, to accelerate the resulting plasma electromagnetically. Power for acceleration is withdrawn from the electric field, so the magnetic field is not depleted. The energy for ionization is a dead loss resulting in residual heating when recombination occurs so some designs will generally seek to employ the minimum acceptable ionization and to gain some useful work out of the recombination heating. These designs might fall in a class of mixed a-thermal/thermal cycles.

Also discussed herein is the use of raw nuclear radiant energy output from leptonics directly to power a PFE, rather than converting the energy output first to electrical power. So, in this sense the PFE discussed herein is not properly an electric propulsion system. Systems that convert nuclear radiation into electric power add weight and complexity that can also compromise system-level performance (especially specific performance) to the point where no net benefit results. Waste heat and adverse consequences of conversion into electric power can be averted by using nuclear energy of leptonics directly by eliminating the energy conversion. Relatively small amounts of energy can be drawn off the PFE engine cycle for hotel electric power (HEP), sensors, or other on-board systems.

The type of nuclear decay employed herein occurs in three ways, beta−, beta+, and EC (electron capture). In these decays, a nuclear neutron (or proton) changes into a nuclear proton (or neutron) with the ejection of neutrinos and electrons (or positrons). The energy release mechanism from leptonic fuels is referred to as beta decay, implying either electron capture decay or internal conversion decay, and produces some mixture of beta and gamma radiation. For the PFE devices discussed herein, associated gamma radiation is marginally useful for purposes of establishing and maintaining the plasma conductivity, while the beta radiation is directly useful in the engine cycle. The combined beta and gamma radiation permeate the interior housing of the engine, passing through the working material or fluid that has been introduced as a mass augmentation agent, and ionizing a small fraction of the working material as it passes through the housing. The beta radiation is absorbed on electrodes arrayed along the length of walls of the housing building up electric charge and establishing an electric field that accelerates the ionized material. In many examples of leptonics, the proportion of gamma radiation is relatively large compared to beta radiation and the PFE device can benefit by passing at least some of the gamma radiation through a membrane or target material first that converts the gamma radiation to beta radiation (e.g. high energy electrons) by the photoelectric effect. This conversion advantageously preserves the full momentum vector (direction and magnitude) of the gamma radiation in the resulting beta radiation. The result is direct use of both gamma and beta radiation from a leptonic power source to energize and power a PFE device without first converting to electric power.

FIG. 1 is presented as a schematic view of an example plasma fuel engine (PPE) with a leptonic source. FIG. 1 illustrates system 100 comprising housing 110, leptonic source 120, control system 121, magnetic field source 122, power circuitry 123, and thrust material source 125. Housing 110 includes anode 111 and one or more cathodes 112, which might represent more than one instance of each.

In operation, working fluid 115 from thrust material source 125 is provided into input aperture 113 and accelerated to exit from housing at output aperture 114. Thrust material source 125 might provide gas from the surrounding atmosphere or environment around the PFE, such as when an associated vehicle is traveling within the atmosphere of Earth or when harvesting particulate material from space (e.g. gas sequestered at a Lagrange point). In another example, thrust material source 125 might comprise fluid provided from a propellant tank or compressed gas/liquid tank which is pumped or otherwise directed towards input aperture 113. On-board fluid/gas might be provided when an associated vehicle is traveling a region of the atmosphere of Earth without sufficient atmospheric density to support a desired thrust or when traveling in the vacuum of space. A combination of on-board fluids and externally-sourced fluids can be employed as working fluid 115. Working fluid 115 is introduced having a particular inertial property, such as speed and/or energy at input aperture 113, accelerated through housing 110, and ejected at a greater speed and/or energy at output aperture 114. This is represented in FIG. 1 as a first flow speed 101 and a second flow speed 102 after an acceleration.

The acceleration of working fluid 115 is provided within housing 110 using energy in the form of high-energy beam electrons 150, referred to as beta ($\beta$) radiation, provided by leptonic source 120 to both establish electric field (E) 151 in housing 110 and at least partially ionize working fluid 115 to be accelerated by electric field 151. Once working fluid 115 is partially ionized by beam electrons 150, a portion of the electrons of working fluid 115 (referred to herein as plasma electrons) are liberated forming ions within working fluid 115. While the ions are accelerated towards output aperture 114 by electric field 151, plasma electrons are induced to flow in the opposite direction. This behavior is due in part to the large mass difference between electrons and ions, on the order of 1:2000. However, magnetic field source 122 establishes magnetic field (B) 152 into housing 110 which entrains or partially immobilizes plasma electrons with respect to electric field 151. These plasma electrons tend to helically drift with average motion perpendicular to the electric field and the magnetic field lines (152) instead of participating in the flow of working fluid 115. Meanwhile, the ions of working fluid 115 transfer momentum to other particles of working fluid 115, such as neutral (non-ionized) particles or other ions. The ions are accelerated by electric field 151. In the idealized case, the force on each ion is F=qE, and the total force is F=nqE, where 'q' is the particle charge, 'n' is the number of ions, 'E' is the intensity/direction of the electric field. However, this force can depend on the density of working fluid 115, the ionization fraction, the magnetic field, and such. Momentum transfer from beam electrons 150 occurs, but for the examples herein the momentum transfer will be small enough to neglect. Thus, the momentum transfer that matters more is between the ions of working fluid 115 and the neutral particles in working fluid 115.

An electric field in housing 110 can be established using a conventional electrical power supply coupled between electrodes on housing 110. However, this conventional technique would require a dedicated electrical power source, along with any associated power conversion equipment and corresponding inefficiencies. In the examples herein the electric field is instead established by leptonic source 120. Beam electrons 150 are injected into housing 110, aimed to stream across the flow of working fluid 115 at an oblique angle. FIG. 1 shows example injection of beam electrons 150 from leptonic source 120 towards cathodes 112. The point where the electrons are emitted is anode 111, the point where they are collected after passing through working fluid 115 are cathodes 112, and an electric field (E) 151 is generated between anode 111 and cathodes 112. A benefit to this approach is that the energy output of leptonic source 120 that emits beam electrons 150 can be directly used without lossy and heavy conversion, and beam electrons 150 streaming through working fluid 115 creates the ionization for current flow. The direction of electric field 151 is then a function of the direction in which beam electrons 150 are aimed. Electrons sourced from beam electrons 150 can also be redistributed among electrodes through electrical connections once they are collected by cathodes 112 to further refine the direction of electric field 151. A strength of electric field 151 is proportional to how many electrons are supplied by beam electrons 150, and the energy of each of the electrons of beam electrons 150.

The total current flow within working fluid 115 in housing 110 includes both beam electrons 150 and plasma electrons. However, the majority of the current flow is provided by plasma electrons, because beam electrons 150 are effectively decoupled from the flow of working fluid 115 due to their high energy. Although once individual electrons among beam electrons 150 lose a sufficient portion of their energy and become entrained with the flow, these individual electrons count as "plasma" electrons and not as "beam" electrons. Anode 111 is located at a leading edge or input aperture 113 of housing 110, and there are or more cathodes disposed along the length of housing 110. One cathode is shown in FIG. 1 for clarity, and further examples with multiple electrodes are included in FIG. 2. Beam electrons 150 deposit charge (electrons) on cathodes 112, and that charge can be redistributed as necessary by wiring (not shown). Plasma electrons travel back through working fluid 115 in housing 110 from the cathode to the anode under the action of electric field 151. Thus, there are two populations of electrons: beam electrons 150 that shoot downstream against the electric force of electric field 151, and plasma electrons that move upstream according to the electric force. The term 'anode' is used intentionally as system 100 would naturally be embedded in a circuit restoring the lost electrons to maintain change balance in the system. Because of the rapid emission of electrons via beam electrons 150, the charge on anode 111 is naturally highly positive and would be neutralized by electron sources (e.g. cathodes) returning electrons to anode 111 by reverse electron flow through the plasma of working fluid 115, which is similar to a magnetohydrodynamic (MHD) current flow direction.

The induced voltage between cathode and anode is a function of the initial kinetic energy of beam electrons 150 after passing into housing 110. Beam electrons 150 lose energy at least due to energy deposition into working fluid 115 and climbing the potential between the anode and the cathode, which can correspond to the following equation:

$$\frac{\partial \varepsilon}{\partial x} = -Y(x) - q\nabla V(x)$$

which can be integrated and rearranged to get the voltage:

$$V = \frac{\varepsilon_0}{q} - \frac{1}{q}\int_0^L Y(x)dx.$$

Where Y(x) is the differential energy deposition of the electron beam into working fluid 115, and depends on several factors (e.g., electron energy, gas density, and gas composition) and is a known quantity for atmospheric gases (air). An appropriate balance between energy deposition (ionization) and induced voltage dictates the desired energy of the electron beam, though from immediate considerations (inducing several kV/m along the PFE), the desired energy should not be less than several tens of keV after passing into a chamber/housing of modest size. Electron beams can produce a conductivity of 0.5 S/m in 0.6 atm air with 1 W/cm$^3$ of beam power deposition.

As mentioned above, beam electrons 150 are provided by leptonic source 120. Leptonic source 120 comprises one or more materials having properties which support beta decay or electron capture type of inverse beta decay. These materials may comprise various isotopes or isomers, among other materials. Beta decay isotopes can be viewed as a new class of fuels, referred to as leptonic fuel herein, with specific energy several orders of magnitude greater than any chemical fuel. Such leptonic fuels also play a new role in a thrust engine, that is, leptonic fuels are not especially useful as working fluid 115 because of the mass of each emitted electron. However, systems that include leptonic fuels can employ another source of mass flow. This mass flow can be harvested from the atmosphere (e.g., an airbreather arrangement) or store it on-board an associated vehicle and pump it into housing 110 (e.g. a rocket-like arrangement). Systems that include leptonic fuels are able to make use of much higher specific energy fuels than heat engines alone can tolerate.

One example leptonic fuel is $^7$Be, a nuclear isotope of beryllium having 4 protons and 3 neutrons. This isotope can undergo electron capture decay into $^7$Li, a lithium isotope having 3 protons and 4 neutrons. Decay of $^7$Be transmutes to $^7$Li, a stable daughter, absorbing an electron and transmuting one proton into a neutron with a net release of 0.862 MeV. One decay product of $^7$Be is a 478 keV (0.478 MeV) gamma photon, which is generated in approximately 10% of the decays. These gamma photons are converted by leptonic source 120 to electrons by placing a metallic target in an emission path, from which electrons are produced by the photoelectric effect resulting in a nuclear-energized anode 111. While doing even a single conversion between photons and electrons is costly in terms of potential energy losses, the arrangement of leptonic source 120 shown in FIG. 1 allows housing 110 to fully contain the $^7$Be and its daughter element, $^7$Li, while releasing only electrons into the surrounding environment external to housing 110. The energy of the beam electrons produced in this manner can be significantly smaller than that of the gamma photons, such as 25%, or 100 keV, which is roughly the energy of the K-shell electrons most likely to be ejected in this interaction. The direction of the beam electron motion is, on average, preferentially at an angle normal to the emitting surface that conserves momentum.

Leptonic source 120 thus employs energetic electrons to form beam electrons 150 electron beam that can pass through a window in a wall of housing 110, pass through working fluid 115 and deposit energy by ionizing collisions with particles of working fluid 115. Due to the specific energy of beam electrons 150, each emitted electron is expected to produce thousands of ionizations in working fluid 115. After transiting a portion of working fluid 115, beam electrons 150 are collected on cathodes 112. The ionization thus produced in working fluid 115 provides the plasma conductivity needed to drive current and produce a Lorentz body force on working fluid 115. The collection of electrons of beam electrons 150 on cathodes 112 downstream of the emission point near anode 111 establishes electric field 151 that drives the current in the plasma formed from working fluid 115. Thus, a single energetic beam of beta radiation (beam electrons 150) supplies system 100 with ions and with the electric field powering the acceleration of working fluid 115.

The plasma fuel engine (PFE) described in FIG. 1 can be an air-breathing plasma accelerator. In lieu of breathing ingested air, the PFE may be adapted to breathing exhaust gas from another heat engine (optionally augmented with ingested air) and when that heat engine is a rocket, a Rocket-PFE hybrid configuration arises (R-PFE). The appeal of the R-PFE configuration is that it presents linear combinations of a rocket and PFE operational modes in a single flow path, with the PFE portion having significantly higher $I_{SP}$ than the rocket portion. Because such a configuration can seamlessly shift between rocket and PFE modes, such a configuration offers useful new mission maneuver capability in various applications. For example, hypersonic travel is possible in PFE and R-PFE arrangements, having a power range of megawatt to gigawatt. Moreover, the use of leptonic source 120 provides for a throttleable engine response using a variable intensity of electric field and ionization level that is set by release of beta radiation (beam electrons 150). As will be discussed below, a control system (121) can instruct leptonic source 120 to alter properties of beam electrons 150 to affect the throttle and other dynamic properties of system 100.

Returning to the elements of FIG. 1, housing 110 comprises structural elements that provide a chamber for ionization of an input material and acceleration of that material to produce thrust on an associated vehicle. Housing 110 might comprise a generally cylindrical or tubular arrangement, with at least input aperture 113 and output aperture 114. The sizing of housing 110 can vary by application and according to thrust requirements and energy capability of leptonic source 120, among other variables. Anode 111 and cathodes 112 are disposed onto outer walls of housing 110, with conductive portions of anode 111 and cathodes 112 exposed to working fluid 115. Various high-temperature or erosion resistance coatings, laminates, or materials can comprise the walls of housing 110. Input and output aerodynamic features might be included along with housing 110 for introduction of gas into and out of housing 110. Various chassis members can be included along with housing 110 to form an engine system and couple the engine system to a vehicle, such as nacelles, cowls, channels, flow restrictors, covers, or other elements. When employed in both an atmospheric and space environment, housing 110 might have closable input features to prevent ingestion of particulate matter when internally-sourced fluid/gas is injected/pumped into housing 110.

Anode 111 can comprise any conductive material to support a generally positive charge configuration. Anode 111 might be formed from the same piece of material as used in leptonic source 120 to generate beam electrons from gamma radiation, or conductively coupled to such material. Cathodes 112 can comprise any conductive material to support a generally negative charge configuration from collection of beam electrons 150. Various coatings or surface treatments for anode 111 and cathodes 112 might be included to reduce or prevent erosion from ionized materials or plasmas.

Control system 121 is included as an example monitoring, command, and control system which can operate the various elements of system 100. Control system 121 can be representative of any number of control elements distributed throughout system 100. Control system 121 comprises various circuitry, logic, processing elements, memory elements, storage elements, and communication interfaces. Control system 121 can comprise one or more microprocessors, microcontrollers, field-programmable gate arrays (FPGAs), application specific integrated circuits (ASICs), discrete logic, or other elements. Control system 121 can be implemented within a single processing device but can also be distributed across multiple processing devices or sub-systems that cooperate in executing program instructions. Examples of control system 121 include general purpose central processing units, application specific processors, and logic devices, as well as any other type of discrete circuitry, control logic, or processing device, including combinations, or variations thereof. Control system 121 might include or might be coupled to one or more analog-to-digital conversion units to convert sensor data or telemetry data from an analog format into a digital format. Control system 121 might include one or more network interfaces, RF interfaces, or optical interfaces for communicating over associated links. For example, telemetry/sensor element of housing 110, leptonic source 120, magnetic field source 122, power circuitry 123, and control elements of thrust material source 125 might communicate over associated links with control system 121.

Magnetic field source 122 comprises magnetic field generation equipment and elements, which might comprise electromagnet devices, permanent magnetic materials, superconducting materials along with associated cooling and management equipment, or conventional electromagnetic equipment comprising conductive coils and structural elements. Magnetic field source 122 generates a magnetic field approximately perpendicular to flow of working fluid 115. Magnetic field source 122 might be operable to change or select orientation or angle of the generated magnetic field (152). This can be provided using various mechanisms to rotate magnetic generation elements, or may instead include electronically-steerable arrays of magnetic field generation equipment which can change angle/orientation of the magnetic field. This change in orientation can be instructed or commanded by control system 121, among other elements.

Power circuitry 123 is coupled between anode 111 via link 141 and one or more cathodes 112 via link(s) 142. Power circuitry 123 might employ current generated by electron flow between cathodes 112 and anode 111, and provide at least a portion of this current to power various components of system 100, such as magnetic field sources, leptonic source control elements, control systems, pumps, valves, throttle elements, or other components. In some examples, such as when multiple cathodes are employed, portions of power circuitry 123 can maintain progressively more negative potentials at each cathode to create an electric field vector shown in FIG. 1. This can be achieved using individual power supplies between cathodes, resistor-divider circuitry, active transistor switching elements, or other components.

Thrust material source 125 can take various forms depending upon the type of engine desired. In one example, atmospheric gas is harvested for acceleration through housing 110. Atmospheric gas can be introduced into housing 110 by compressors, turbo compressors, rams, scoops, turbojets, turbofans, ramjets, scramjets, afterburners, and the like. In another example, on-board propellant tanks can be employed to provide gas/fluid to housing 110, along with associated valves, pumps, or turbopumps. Housing 110 might be mounted to an exit portion of a rocket or jet engine and use exhaust gasses as an input gas. Regardless of the type of configuration, corresponding mechanical support features can also be included comprising conduits, pipes, valves, cowls, nacelles, and the like.

Figure 2:
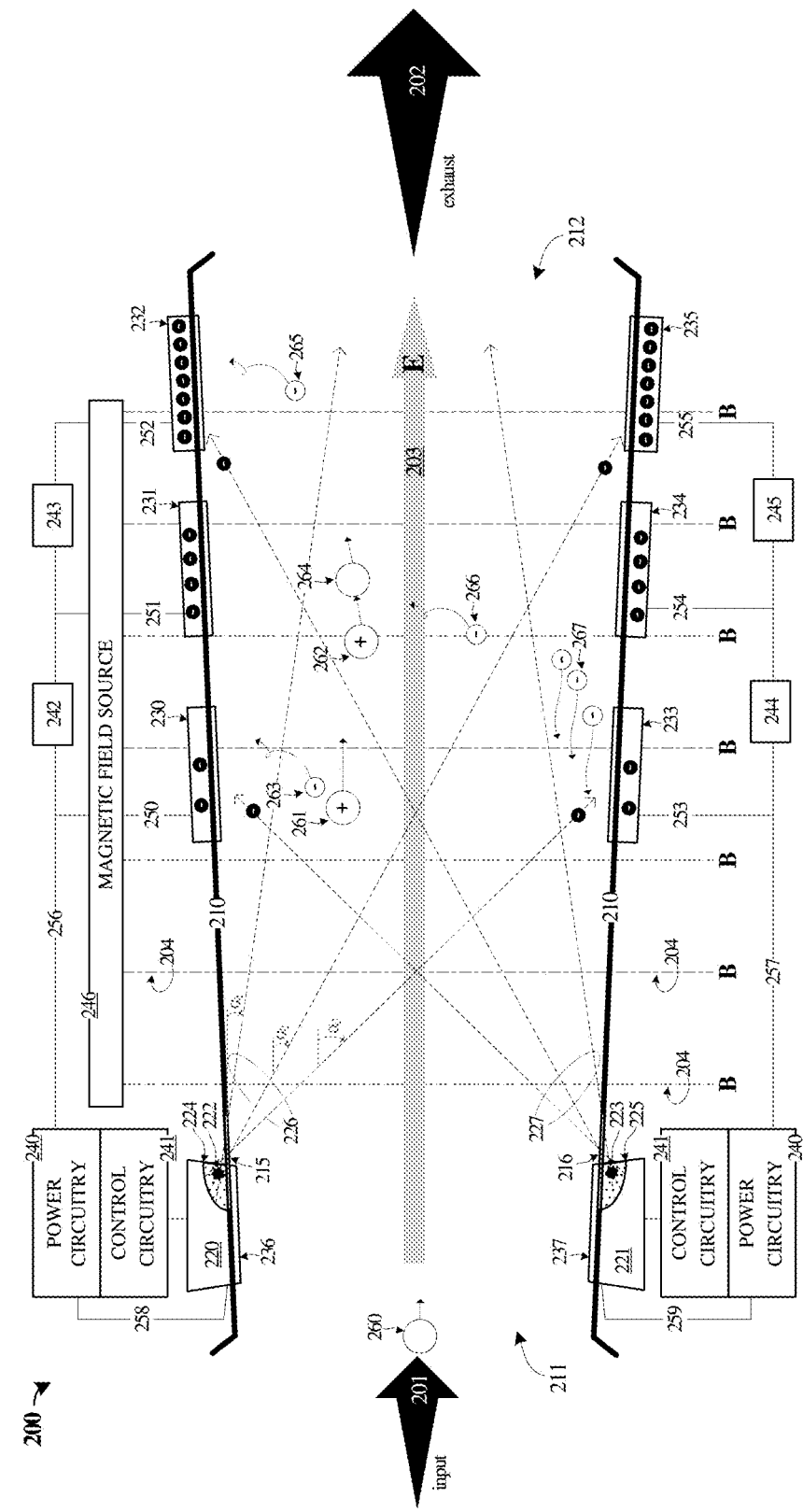
FIG. 2 illustrates a plasma fuel engine in an implementation.

FIG. 2 is included as a further example of a plasma fuel engine having a leptonic power source. FIG. 2 includes several additional features than shown in FIG. 1, as well as highlighting internal particulate/ionic features. FIG. 2 comprises system 200. System 200 includes accelerator housing 210, leptonic sources 220-221, cathodes 230-235, anodes 236-237, power circuitry 240, control circuitry 241, magnetic field source 246, and bias elements 242-245. Housing 210 has input aperture 211 and output aperture 212. Cathodes 230-235 and anodes 236-237 are coupled to housing 210 and expose corresponding conductive terminals to the internal environment of housing 210. Leptonic sources 220-221 each include isotopic material 222-223 and reaction zones 224-225, as well as bulk material. Leptonic sources 220-221 are shown coupled to housing 210, but some elements may be located remote from housing 210.

Leptonic sources 220-221 generate beams of electrons, shown as beam electrons 226-226, which ionizes working fluid 201 into a plasma. Beam electrons 226-226 are injected through apertures or windows 215-216, travel through housing 210, and deposit charge on cathodes 230-235. This deposited charge can be redistributed as necessary by conductive links 250-255 and bias elements 242-245 for use by power circuitry 240-241. Electrons 267 of the resulting plasma can travel back through the plasma in accelerator housing 210 from cathodes 230-235 to anodes 236-237 under the action of electric field 203. Thus, there are two populations of electrons present in accelerator housing 210: (1) beam electrons 226-226 emitted 'downstream' against electric field 203, and plasma electrons 267 that move 'upstream' with electric field 203.

Depending upon the particular beta decay process employed by leptonic sources 220-221, gamma radiation might be produced/emitted into housing 210 as well as beam electrons 226-227. For example, isotopic material 222-223 can emit gamma radiation randomly in all directions, but only the portion of the gamma radiation impinging onto reaction zones 224-225 is converted into beam electrons 226-227 which are directed into housing 210. The remaining portion of the gamma radiation is emitted into housing 210. The example geometry of reaction zones 224-225 subtends only ¼ of the total circumference around isotopic material 222-223, so approximately ¾ of the gamma radiation will not be converted to electrons. This portion of the gamma radiation may produce some ionization within housing 210, but can be considered lost or ignored with regard to thrust calculations. Other instantiations of leptonic sources 220-221 may include different geometry of reaction zones 224-225 or employ decays that produce energy directly as high-velocity electrons instead of gamma radiation.

In FIG. 2, a series of electrodes (cathodes 230-235) are positioned down the length of accelerator housing 210. Cathodes 230-235 are held at progressively more negative potentials from the perspective of anodes 236-237 to create the electric field vector shown as electric field 203. To provide this progressively more negative arrangement, various techniques can be employed. In a first technique, beam electrons 226-226 can be selectively aimed to provide a greater fraction of beam electrons 226-226 at cathodes progressively further downstream from the anodes. FIG. 2 shows various angles ($\alpha_1$, $\alpha_2$, $\alpha_3$) for exemplary beam electrons. These angles can be established by the geometry of reaction zones 224-225, or by lensing/aperture techniques that affect trajectories or statistical populations of beam electrons 226-226 to ensure a greater population of beam electrons 226-226 impinge on further downstream cathodes than upstream cathodes. In a second technique, controllable conductive links and bias elements can be positioned between each of the cathodes to shuttle charge (electrons) between the cathodes. FIG. 2 shows bias elements 242-245 which can be coupled to cathodes over associated links 250-255 and to power supply circuitry over links 256-257. Bias elements 242-245 might comprise charge pump elements, voltage dividers, power electronics, or other (switched or active) power supply components. Bias elements 242-245 allow the potential/charge between the cathodes to be fine-tuned according to desired properties of electric field 203. For example, beam electrons 226-226 might charge all cathodes equally to 10 kilovolts (kV), but bias elements 242-245 can be employed to alter the voltage of each cathode progressively lower in voltage by 1 kV. Thus, cathode 230 might be held at 10 kV, cathode 231 held at 9 kV, and cathode 232 held at 8 kV, among other example voltages. These voltages can establish desired properties of electric field 203, which then provides a force onto ions and electrons of the plasma generated by beam electrons 226-226 in working fluid 201.

In operation, material is introduced into housing 210 via input aperture 211 as working fluid 201. New working fluid can be drawn into housing 210 or pumped into housing 210 as existing working fluid exits housing 210 as exhaust 202. Working fluid 201 comprises neutral particles 260 which enter housing at input aperture 211 and eventually become partially ionized by interaction with beam electrons 226-226, creating a plasma within housing 210. This plasma includes ionized particles 261-262 and plasma electrons 263-267 which are liberated from neutral particles 260. Ions will respond to electric field 203 by moving downstream (rightward) in FIG. 2. Plasma electrons (263) are separated from ionized particles 261-262 and initially might have momentum in the downstream direction. Electric field 203 exerts a force on plasma electrons in the upstream direction. Concurrently, magnetic field source establishes magnetic field 204 approximately perpendicular to the downstream/upstream flow within housing 210. Magnetic field 204 induces plasma electrons (265-266) to execute a helical 'drift' with average motion in a direction perpendicular to both the electric field (E) and magnetic field (B). Thus, magnetic field 204 acts to separate plasma electrons from the flow and entrain them in the magnetic field. As the plasma electrons lose downstream momentum under the action of the magnetic field lines, eventually the plasma electrons are directed by electric field 203 upstream. This upstream motion forms a current in the plasma indicated by electrons 267, which may have angled/helical drifting with respect to the applied magnetic and electric fields. Furthermore, ions 261-262 in the plasma transfer momentum to other particles within working fluid 201, such as other ions, electrons, and neutral particles. In FIG. 2, momentum transfer occurs between ions (262) of the plasma within housing 210 and neutral particles (264) of working fluid 201. Momentum transfer may also transfer between ions of the plasma, but since the ions typically gain momentum from electric field 203, the momentum transfer between ions and neutral particles accounts for a larger portion of the thrust produced by system 200. This momentum transfer occurs primarily via elastic collisions among ions and neutral particles. Ions, neutral particles, and some plasma electrons can exit housing 210 at exit aperture 212, producing thrust using exhaust 202. This thrust can accelerate a vehicle when coupled to housing 210.

FIG. 2 shows magnetic field lines which indicate magnetic field 204 (B) established generally perpendicular to the direction of flow of working fluid 201 as well as to electric filed 203. While this arrangement produces a workable configuration, other orientations of magnetic field 204 can be established. The term 'approximately perpendicular' is used herein to refer to a range of possible orientations of magnetic field 204, still generally perpendicular or orthogonal to electric field 203 but variable within a certain range of angles/orientations. Magnetic field source 246 can adjust the approximately perpendicular angle to select among performance characteristics for the thrust corresponding to thrust magnitude and specific impulse magnitude. Although many examples will have the approximately perpendicular angle fixed upon manufacture, other examples can have a dynamically variable approximately perpendicular angle. Since thrust will decrease as the specific impulse increases for a given power, a tradeoff must be made for a particular mission between propellant usage and mission time. High specific impulse leads to low propellant usage. High thrust scenarios can include atmospheric conditions where atmospheric input is available for working fluid 201. High specific impulse scenarios can include operation outside of the atmosphere, such as when propellant or working fluid 201 is provided from an on-board tank.

Control circuitry 241 can control all operational aspects of system 200, such as selecting a quantity of beam electrons to be produced at any given instant, leading to a throttleable variation in thrust. Control circuitry 241 can instruct elements of leptonic sources 220-221 over links 258-259 to have a greater quantity per unit time of beta decays or electron capture decays, such as by releasing a metastable isomer/isotope into a regime where decay is more likely or 'prompt'. Control of leptonic sources is discussed in more detail below. Control circuitry 241 can also control orientations of magnetic field 204 by controlling elements of magnetic field source, which may include electromagnetic elements or electromechanical elements. Control circuitry 241 can also control aspects of power circuitry 240 and bias elements 242-245 to establish desired levels of charge on cathodes or progressive charge arrangements on cathodes. These levels of charge can be altered using links 250-255, as well as links 256-257. Control circuitry 241 can also receive user input to control performance of system 200, such as throttle input, thrust vs. specific impulse selections, on/off indicators, and the like. Moreover, control circuitry 241 can be employed to report various telemetry to users or operators based on current status of elements of system 200, which might include reading of various sensors and telemetry devices distributed throughout system 200. These sensors or telemetry devices can include elements to measure temperature, pressure, ionization of working fluid 201, flow rate of working fluid 201, electric field intensity and direction, magnetic field intensity and direction, vibration, material stress, leptonic performance or conversion metrics, radiation levels among gamma and beta radiation, electrode charge levels, propellant tank levels, ingress and egress rates of working fluids, and other various information.

The materials selected for elements of system 200 can be based on the expected temperatures, pressures, and ionization environments of housing 210. These materials can be employed for walls of housing 210 as well as for anodes 236-237 and cathodes 230-235. Typically, anodes and cathodes will be constructed of metallic or conductive materials. In some cases, the material used to form reaction zones 224-225 will also be used to form anodes 236-237. This material might comprise a high-density material, such as lead, depleted uranium, or other dense and conductive material with sufficient high-valence electrons available for liberation using gamma radiation produced by isotopic material 222-223. When isotopic material 222-223 produces direct beta radiation, then reaction zones 224-225 may be omitted.

Figure 3:
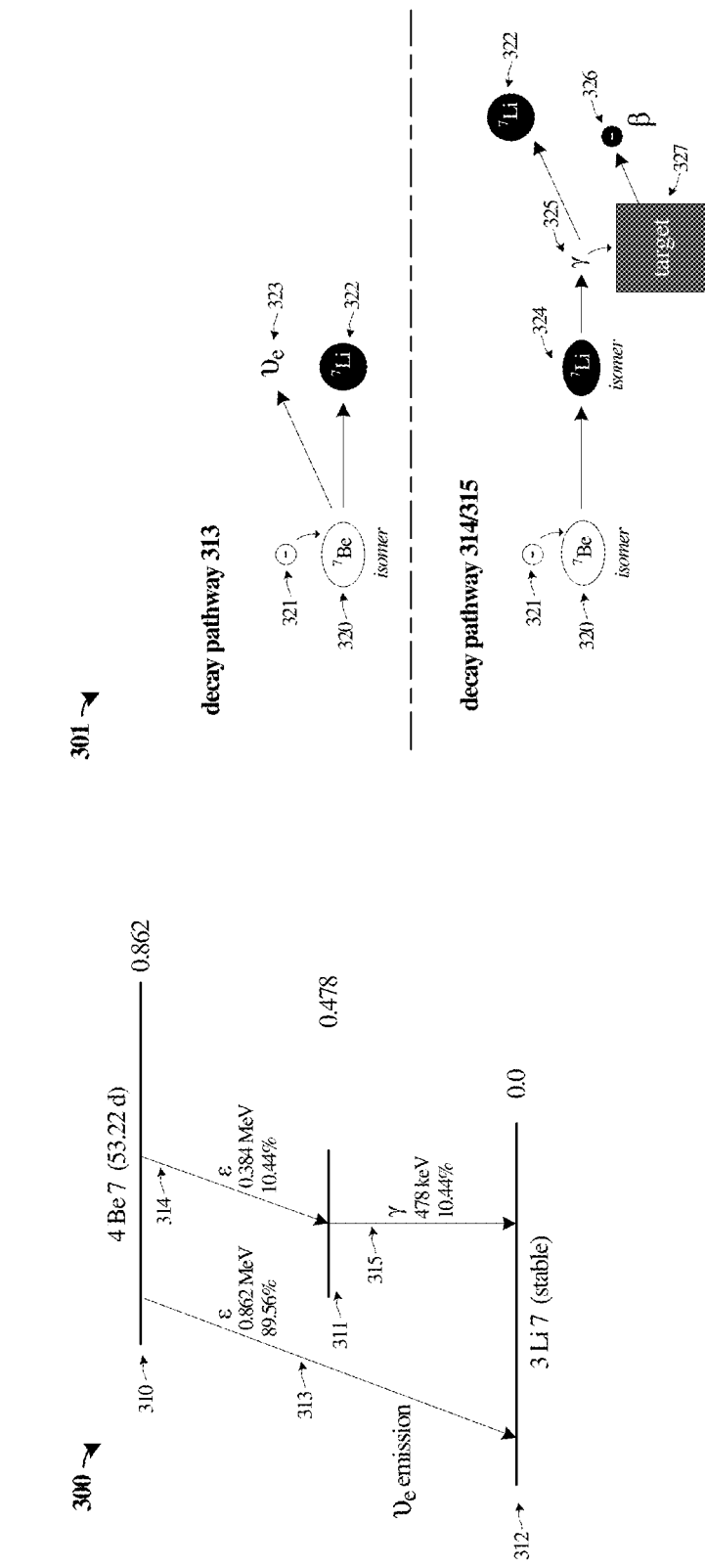
FIG. 3 illustrates example electron capture decay operations.
Figure 4:
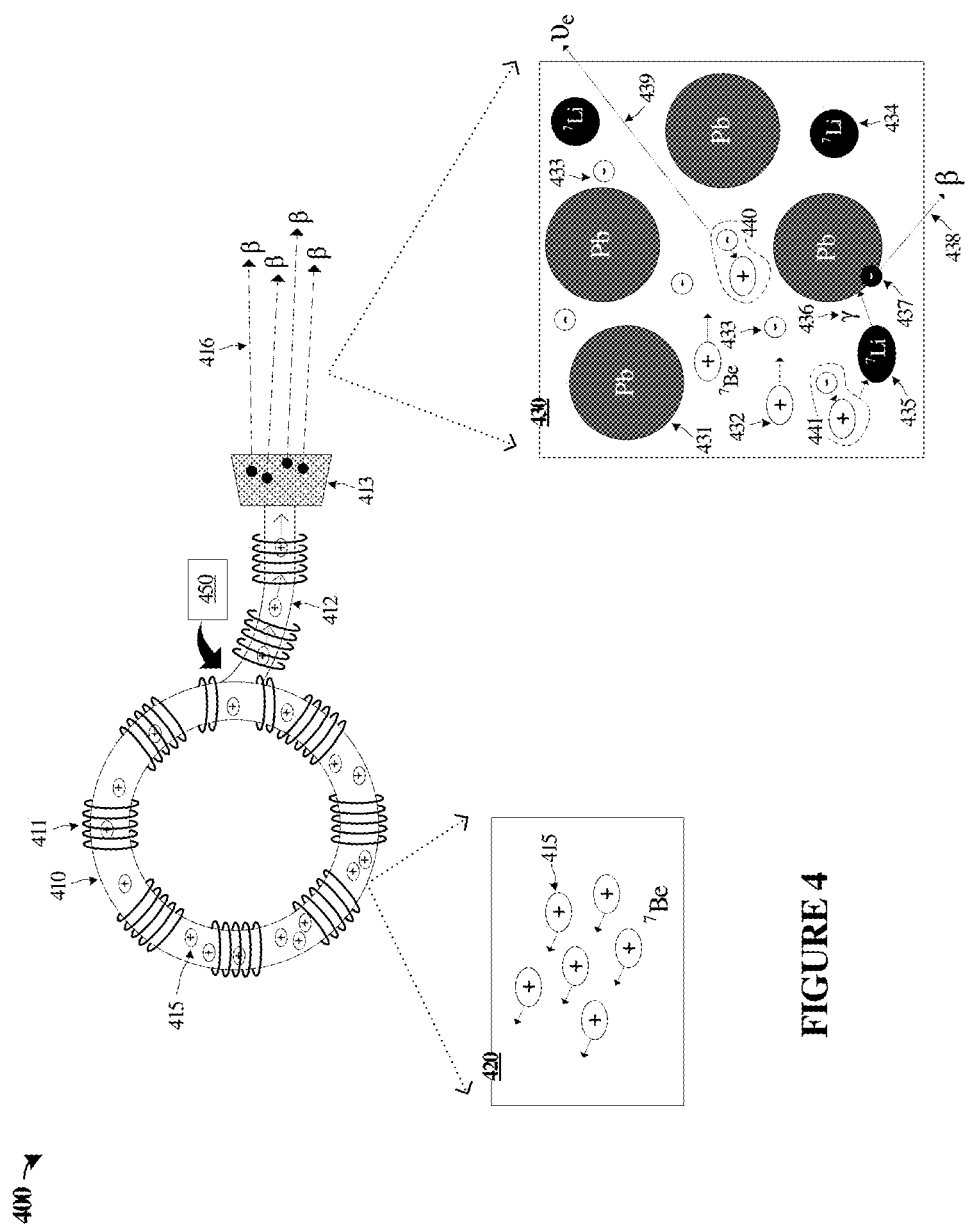
FIG. 4 illustrates a leptonic source in an implementation.
Figure 5:
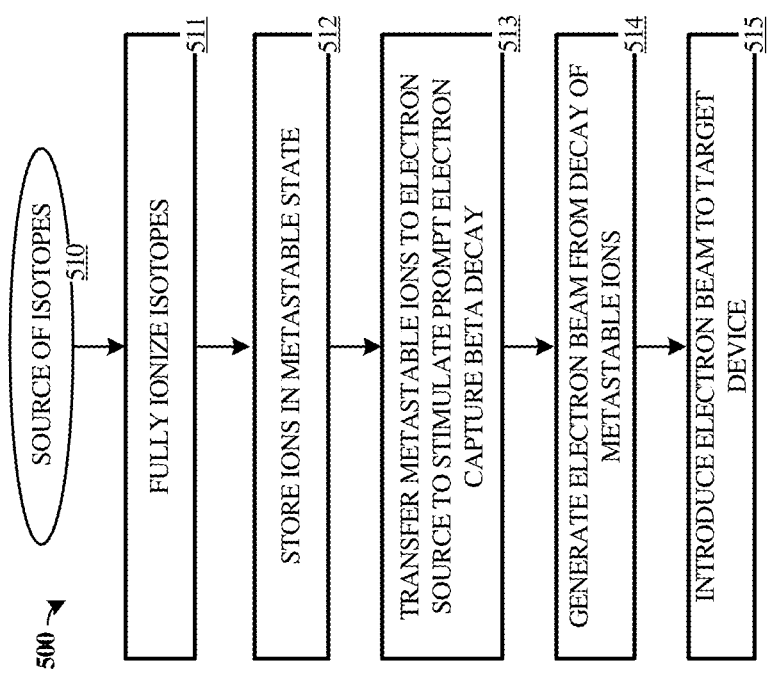
FIG. 5 illustrates a method of operating a leptonic source in an implementation.

Turning now to a discussion on example leptonic sources, FIGS. 3-5 are presented. FIG. 3 illustrates an example isotopic decay using electron capture. FIG. 4 illustrates an example device or system which can employ such isotopic decay to produce beta radiation for injection into an engine housing. FIG. 5 illustrates an example method of operation of such leptonic sources. In FIGS. 3-5, isotopes $^7$Be and $^7$Li are discussed, and these isotopes can also be referred to as 4 Be 7 and 3 Li 7, respectively.

FIG. 3 includes decay examples 300 and 301. Decay example 300 includes decay via transmutation of $^7$Be into $^7$Li. One example leptonic fuel is $^7$Be, a nuclear isotope of beryllium having 4 protons and 3 neutrons. This isotope can undergo electron capture decay into $^7$Li, a lithium isotope having 3 protons and 4 neutrons. Decay of $^7$Be transmutes to $^7$Li, a stable daughter, absorbing an electron (c) and transmuting one proton into a neutron (implying that one up-quark in the $^7$Be nucleus has been flipped to a down-quark) with a net release of 0.862 MeV, referred to as the reaction Q. Energy level 310 corresponds to this 0.862 MeV potential energy. In an initial state, $^7$Be (4 Be 7) can decay via two pathways 313 and 314/315. Decay pathway 313 includes absorption of an electron and transmutation of one proton of $^7$Be into a neutron and emission of a neutrino having an energy of 0.862 MeV, such as an electron neutrino ($\upsilon_e$), to reach energy level 312. Energy level 312 corresponds to $^7$Li (3 Li 7). Decay pathway 313 occurs 89.56% of the time, approximately 9 out of 10 decays. Decay pathway 314 includes absorption of an electron and transmutation of one proton into a neutron to form an intermediary excited version of $^7$Li at energy level 311 which is 0.384 MeV less than energy level 310. At a later time, this excited version of $^7$Li can relax by emission of a gamma photon having energy of 0.478 MeV to reach energy level 312. Decay pathway 314/315 occurs 10.44% of the time, approximately 1 out of 10 decays. This 0.478 MeV gamma photon, which is generated in approximately 10% of the decays, translates to a specific energy of 6.6×10$^{11}$ J/kg, orders of magnitude greater than chemical fuels. These gamma photons are converted by a leptonic source to electrons by placing a metallic target in an emission path, from which electrons are produced by the photoelectric effect. This process is discussed in decay example 301 and FIG. 4.

In decay example 301, decay pathways 313 and 314/315 are shown in a different representation. In decay pathway 313 in example 301, electron 321 is absorbed by isotope $^7$Be (320) to produce electron neutrino 323 ($\upsilon_e$) and $^7$Li. In decay pathway 314/315 in example 301, electron 321 is absorbed by $^7$Be (320) to produce an excited state of $^7$Li (324) which relaxes into a stable configuration of $^7$Li (322) and produces gamma photon 325 (γ). Gamma photon 325 can be directed toward target 327 to liberate beta electron 326 (β) from target 327 by the photoelectric effect. This beta electron 326 can be used to form a plasma and electric field for a plasma fuel engine. Beta electron 326 corresponds to beam electrons 150 in FIG. 1 and beam electrons 226-227 in FIG. 2.

It should be noted that the excited 478 keV state of $^7$Li might be referred to as an 'isomer' of lithium. However, in a strict sense, the term isomer might not be appropriate in that isomer half-lives must exceed some agreed, but arbitrary, value that renders the isomer measurable as such. Nonetheless the concepts of the excited 478 keV state of $^7$Li are the same whether called an 'isomer' or not.

FIG. 4 illustrates an example system to create beta particles or beam electrons, such as employed for leptonic source 120 in FIG. 1 or leptonic sources 220-221 in FIG. 2, although other configurations are possible. System 400 includes containment structure 410 and target material 413 which produce beta particles as beam electrons 416 (β). Detailed views 420 and 430 are included to illustrate various features of system 400.

Turning first to containment structure 401, a ring structure is presented. This ring structure can provide a style or ion trap or magnetic bottle, where electromagnetic elements 411 are disposed around the ring structure to contain and direct ionized $^7$Be nuclei 415. Each ionized $^7$Be nucleus is fully ionized in this example, which corresponds to no orbital/valence electrons. Moreover, no electrons are included in the collection of $^7$Be nuclei, providing for bare nuclei of $^7$Be within containment structure 401. Detailed view 420 shows one such arrangement, with a collection of $^7$Be nuclei having associated motion around the ring structure without contact with the walls of the ring structure. Other magnetic or electromagnetic containment solutions are possible to contain nuclei of $^7$Be.

Once beta particles are desired to be produced, control element 450 can be instructed to extract a portion of nuclei 415, perhaps via a controllable diversion channel, magnetic valve, or magnetic throat arrangement shown by channel 412. These nuclei 415 are directed toward target material 413 which (as detailed in view 430) includes lead (Pb) atoms 431 having ample electrons within the bulk material as well as associated with each Pb atom. As nuclei 415 come into proximity with electrons, each nucleus 415 can undergo a decay process to convert into $^7$Li nuclei. Various materials can be employed for target material 413 which exhibit loosely coupled elections when in a bulk material form, such as various metallic materials, f-block elements, d-block elements, rare earth materials, and the like, including combinations thereof.

Several processes are shown in view 430. In a first interaction 441 between a $^7$Be nucleus and an electron in target material 413, $^7$Be undergoes electron capture decay into an excited state of $^7$Li 435—which then relaxes into another state of $^7$Li (434) by releasing a 478 keV gamma photon 436 (γ). Gamma photon 436 liberates electron 438 from target material 413, such as from a Pb atom or free electron (433) in the bulk material. Electron 438 is now emitted as β (beam electron 416). In a second interaction 440 between a $^7$Be nucleus and an electron in target material 413, $^7$Be undergoes electron capture decay into $^7$Li (434) by releasing $\upsilon_e$ 439 which exits target material 413 without further interaction. By control of release of a quantity of nuclei 415 from containment structure 415, electron capture decay of $^7$Be can be prompted to produce corresponding beam electrons 416. This decay is prompt—meaning the average time lapse between ion-electron collisions and the subsequent release of energy is less than a design amount that sets the maximum power available from each decay.

As noted above, about 10% of the decays produce a gamma photon, with the other 90% releasing a non-interacting neutrino. Additionally, rare bound-state beta decays can occur for some materials (referred to as two-body decays), in which a produced electron might remain bound to a particular nucleon. Thus, gamma radiation will be the primary useful output of this process, which is leveraged to liberate electrons having similar energy from a target material. The geometry of the target material and ability to steer the gamma radiation can play a role in the conversion efficiency overall. Moreover, a conversion between gamma photons and electrons is costly in terms of potential energy losses, but this process allows a corresponding engine to fully contain $^7$Be and $^7$Li, within the engine—releasing only electrons into the environment. Under certain assumptions, electrons produced by this process in FIG. 4 can have significantly smaller energy than that of the gamma photons, such as 25% (or 100 keV), which is roughly the energy of the K-shell electrons most likely to be ejected by gamma photons in this interaction. The direction of the electron motion is, on average, preferentially at an angle normal to the emitting surface that conserves momentum.

Energetic electrons among beam electrons 416 can form an electron beam (although not so well collimated as a standard beam) that can pass through an aperture or window in a wall of a housing or plasma chamber of a PFE, pass through the working fluid, and deposit energy by ionizing collisions with its gas molecules. Each beam electron is projected to cause thousands of ionizations, before being collected on a cathode positioned along the length of the PFE housing. The ionization thus produced provides the plasma conductivity needed to drive current and produce a Lorentz body force on the gas without the need for seeding of special particles in the working fluid. The collection of beam electrons on the cathodes downstream of the emission point (anode) establishes the electric field that drives the current within the housing. Thus, a single energetic beam of beta particles (beam electrons 416) supplies the PFE with ions and with the electric field powering acceleration of the working fluid.

Under certain theoretical frameworks, decay via electron capture of $^7$Be will occur promptly when the (mean)$^7$Be nuclei are mated with a source of charge if $^7$Be nuclei have been stored in a charge-deprived condition long enough to reach a corresponding incipient decay state. Put somewhat differently: a finite quantity of radioactive electron capture material is considered effectively inert after, for example, five half-lives. Likewise, if stored in a charge deprivation state for five half-lives, effectively all of the material will decay promptly when $^7$Be nuclei are rejoined with a source of charge (elections). Thus, decay of $^7$Be nuclei can be triggered based on a lifetime until the $^7$Be nuclei reaches the incipient decay state. The half-life of $^7$Be is 53.22 days, which computes to a mean lifetime of 76.78 days. Bare $^7$Be nuclei can be stored in containment structure 410 for 2-3 half-lives (2× or 3× of 75-78 days) and then released into target material 413 to promptly decay into daughter products. Based on this prompt or triggered decay, 1 gigawatt (GW) of power for 15 minutes might take 1.4 kg of $^7$Be.

FIG. 5 illustrates a method of operating a leptonic source, such as any among leptonic sources 120 or 220-221, or the examples shown in FIGS. 3-4. Operations 500 of FIG. 5 are noted parenthetically in the discussion below and reference elements of FIG. 4.

Initially, a source of suitable isotopes is assembled (510) for a leptonic fuel. A leptonic fuel is a fuel that releases energy from lepton absorption in the atomic nucleus that flip up-quarks to down-quarks rather than from molecular bonds of chemical fuels or the strong force interactions of nuclear power. Technologies utilizing leptonic fuels exhibit performance orders-of-magnitude above chemical/electrochemical prime movers and expel orders-of-magnitude less waste as a result. To create throttleable power using leptonic fuels, a system is employed to command prompt energy release, i.e., to "burn" the leptonic fuels on demand Weak nuclear force energy release can be controlled within plasmas that incorporate stripped hadron-lepton collisions if the collision scenarios are well-enough controlled to enhance cross-sections and remove interaction barriers posed by various physical conservation rules. Such plasmas exist momentarily in the hadronic volume (e.g. atomic nucleus) during compatible electron-hadron collisions.

One example isotope selected for a leptonic fuel is $^7$Be. Stable beryllium ($^9$Be) has 5 neutrons and 4 protons, whereas $^7$Be has 3 neutrons and 4 protons. Decay of $^7$Be occurs via electron capture (sometimes referred to as inverse beta decay), instead of direct beta decay. Masses of isotope $^7$Be may be manufactured within fission-style nuclear reactors or by particle accelerators, among other methods. Other example leptonic fuels might employ isomer-based metastability. In some isotopes, raising the nucleus to a higher metastable energy state can boost its half-life dramatically, rendering it, in effect, relatively stable. These metastable states are called "isomers" of the isotopes provided their half-lives are long enough to be measurable.

In operation 511, a quantity of the selected isotope is stripped of orbital electrons by full ionization to produce bare nuclei or bare ions. Certain otherwise radioactive isotopes, such as those that decay by electron capture (e.g. $^7$Be), are metastable and non-radioactive when denied access to nuclear electrons. Nuclear electrons, as used herein, are ordinary leptons that are positioned close enough to a nucleus so that their wave function overlap with the nucleus. The ionization of $^7$Be can be achieved using various known atomic ionization processes. Once ionized, the bare ions are stored in this metastable state without access to electrons (512). In FIG. 4, one example storage technology is presented as a ring-style storage device (containment structure 410) that employs electromagnetic elements or magnetic elements to confine ions into a storage ring. Containment structure 410 can be roughly 1.4 meters in diameter and adapted to hold high current at low energies to store a reasonable amount of $^7$Be in a stable state for a suitably long duration. Containment structure 410 is not entirely passive and will have some maintenance power requirements associated with electromagnetic elements, thermal control, telemetry, and other features. The maximum energy available from one mol of $^7$Be decay is approximately one tenth of a gigawatt-day.

Control element 450 of containment structure 410 transfers (513) metastable ions to an electron source to stimulate prompt electron capture beta decay. In this example, the fully ionized $^7$Be particles are transferred from the ring structure through channel 412 to target material 413 for production of electrons (β). The energy from leptonic fuels can be released promptly on demand to achieve utility in devices such as PFEs or as general-purpose power sources. When stripped of all orbital electrons to a bare ion (e.g.

atomic nucleus), the strong positive charge of the bare ion can attract and accelerate an electron into a sharp collision with the nucleus, maximizing captured-electron density in the hadronic volume stimulating the quark flip. Normally, such energy is released in accordance with a natural isotopic half-life. The natural decay scenario of $^7$Be transmutes $^7$Be to $^7$Li, absorbing an electron and flipping one up-quark to a down-quark—all at a net loss of 0.00092534 atomic mass units (AMU), from 7.0169298828 AMU to 7.016004548 AMU or 0.862 MeV.

The incidence of $^7$Be ions onto target material 413 generates (514) beam electrons 416 from electron capture decay. Target material 413 comprises a relatively dense and electron-rich material, typically metallic or conductive. These materials typically form a lattice structure which include a population of valence electrons that are free to move about the bulk of the material. This arrangement of electrons provides donor electrons which participate in the prompt electron capture (EC) decay process of $^7$Be. This electron capture decay can produce neutrinos as well as gamma photons. In addition to providing free electrons for EC, target material 413 also can provide a source for electrons to be liberated using gamma photons and produce beam electrons 416 via the photoelectric effect. The photoelectric effect dominates gamma-metal interactions until a threshold—dependent upon the size of the metal nucleus—above which Compton scattering dominates. For lead (Pb), this threshold is about 600 keV. These beam electrons 416 can then be introduced (515) to a target device, such as a PFE to generate thrust or to a general-purpose power supply to generate electrical power directly from deceleration of the electrons.

Thus, operations 500 described in FIG. 5 provide for a leptonic source configured to hold isotope ions in a confinement state in which nuclear decay (such as electron capture decay) is below a threshold probability. Then, upon command of a control element, a portion of the isotope ions are released from confinement for prompt nuclear decay to produce radiation for ionizing a working fluid of an engine or for direct use as a power source. In one example, the radiation produced comprises gamma photons for impingement onto a target material and liberation of the beam electrons from the target material. Control of the quantity of the portion of the isotope ions released from confinement is selected to achieve a selectable energy output level. In engine examples, the selectable energy output level corresponds to an ionization degree of the plasma and the selectable intensity of the electric field produced from resulting charge distributions. Advantageously, when employed in a flight/engine system, the leptonic sources discussed herein are designed to release no harmful radiation, leave no radioactive residue (fallout), and be inert in an anomalous flight incident. In a worst case, if all the leptonic fuel were released freely into the environment, 90% would decay via harmless neutrino release and rest would decay to inert $^7$Li in a year or less.

Figure 6:
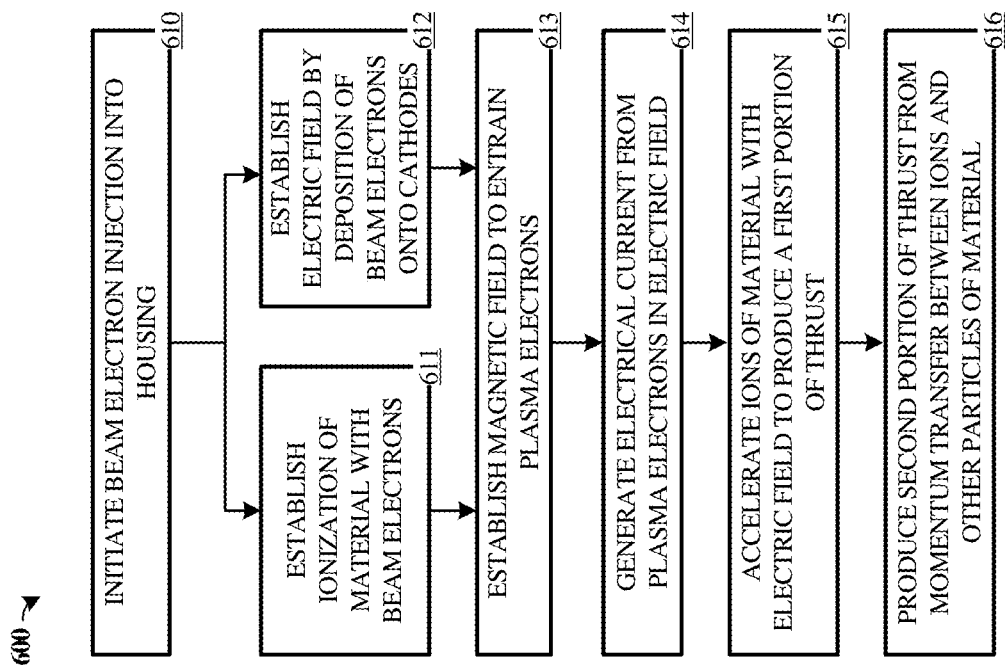
FIG. 6 illustrates a method of operating a plasma fuel engine in an implementation.

FIG. 6 illustrates a method of operating an engine that employs a leptonic source, such as any among system 100 in FIG. 1 or system 200 in FIG. 2. Operations 600 of FIG. 6 are noted parenthetically in the discussion below and reference elements of FIG. 2.

In operation 610, control circuitry 241 initiates (610) beam electrons 226-227 into housing 210 to establish (611) ionization of a material with beam electrons 226-227. Beam electrons 226-227 are provided by leptonic sources 220-221 in FIG. 2. As discussed above, various nuclear decay processes, combined with photoelectric effect processes, can be employed to produce an intense beam of electrons (β). Beam electrons 226-227 are injected through windows 215-216 into housing 210 and ionize working fluid 201 into a plasma within housing 210. This ionization creates ions 261-262 and liberates electrons 263 and 265-267, defining a plasma.

Plasma (also referred to as ionized gas) is an energetic state of matter in which some or all of the electrons have become separated from atoms. Excitation of a plasma requires at least partial ionization of neutral atoms and/or molecules of a material. There are two broad categories of plasma, hot plasma and cold plasma. In a hot plasma, full ionization takes place, and the ions and the electrons are in thermal equilibrium. A cold plasma (also known as a weakly ionized plasma) is one where only a small fraction of the atoms in a gas are ionized, and the electrons reach a very high temperature, whereas the ions remain at the ambient temperature or slightly above. Cold plasma can be created by using a high electric field, through electron bombardment, or by other means.

In this example, ionization is caused by collisions between particles of working fluid 201 and beam electrons 226-227. At least partial ionization is achieved for individual particles of working fluid 201, and the entirety of working fluid 201 is typically not ionized. In fact, the level of ionization is selectable or controllable. Leptonic sources 220-221 are configured to emit beam electrons 226-227 into housing 210 to ionize working fluid 201 into a plasma according to a selectable ionization degree. Also, beam electrons 226-227 deposit charge onto cathodes 230-235 to establish (612) electric field 203 of a selectable intensity in the plasma. This selectable ionization degree and selectable intensity of electric field 203 can ultimately correspond to an amount of thrust produced by system 200. Control circuitry 241 or other control elements can control the release of ions within leptonic sources 220-221 to control a rate of decay. This rate of decay corresponds to an intensity of beam electrons 226-227 and controls the selectable ionization degree and the selectable intensity of electric field.

To further refine the selectable intensity of electric field, leptonic sources 220-221 or windows 215-216 of housing 210 are configured to emit beam electrons 226-227 with an angular configuration among cathodes 230-235 that establishes a progressively more negative charge on cathodes 230-235. Cathodes 230-235 are coupled to housing 210 downstream from anodes 236-237. Cathodes 230-235 are established as progressively more negative in charge among each other in the downstream direction (i.e. to the right in FIG. 2). Power circuitry is electrically coupled between anodes 236-237 and cathodes 230-235, or among individual cathodes 230-235. This power circuitry comprises power circuitry 240 as well as bias elements 242-245. This power circuitry establishes the progressively more negative charge arrangement. This progressively more negative charge arrangement forms the intensity and direction of electric field 203 within the plasma of housing 210. In addition to the progressively more negative charge arrangement, the power circuitry can provide electrical power to other circuitry in system 200. This other circuitry can include control circuitry 241 configured to control the selectable ionization degree of the plasma and the selectable intensity of the electric field according to a desired thrust level.

In addition to electric field 203 within housing 210, system 200 also establishes (613) magnetic field 204 to entrain plasma electrons of working fluid 201. Magnetic field 204 is produced by magnetic field source 246 as an approximately perpendicular magnetic field in relation to electric field 203 or approximately perpendicular to the flow of particles in housing 210. Magnetic field 204 acts to operate on any charged particle within housing 210, but due to the much larger masses of ions in the plasma, electrons typically feel the effects of magnetic field 204 to a much larger degree. Magnetic field 204 at least partially entrains plasma electrons, such as shown for electrons 265-266. This entrainment corresponds to causing plasma electrons to helically drift with average motion perpendicular to the electric field and the lines of magnetic force instead of traveling according to a prior direction of movement. Thus, magnetic field 204 allows the plasma electrons to more easily either impinge on cathodes or receive momentum in the upstream direction from electric field 203. All the power for acceleration of plasma electrons is withdrawn from electric field 203, so the magnetic field is not depleted from this activity. Thus, when changes to angles of the magnetic field are not desired, permanent magnets can be employed since only a small amount of energy is needed for this process of entrainment. However, an electromagnet device with a selectable or adjustable angle can be employed when changes to angles of the magnetic field are desired. As mentioned herein, the approximately perpendicular angle can be mechanically or electrically selectable or adjustable to select among performance characteristics for the thrust corresponding to thrust magnitude and specific impulse magnitude.

System 200 generates (614) an electrical current from plasma electrons and plasma ions within electric field 203. Electric field 203 acts on both ions and electrons, albeit to produce a force in opposite directions. Electrons of the plasma in housing 210 which have been entrained by magnetic field 204 are accelerated by electric field 203 by moving upstream (leftward direction in FIG. 2) as seen for electrons 267. These electrons can propagate upstream between cathodes and anodes, eventually deposited onto anodes 236-237. Ions are accelerated (615) downstream by electric field 203 to produce a first portion of thrust for system 200 from the ions exiting housing 210. These ions also transfer momentum via collisions with other particles of working fluid 201, such as neutral particles introduced to housing 210 that have not been ionized by beam electrons. System 200 thus produces (616) second portion of thrust from momentum transfer between ions and these other particles of material. These neutral particles can be introduced from at least one among ingested atmospheric gas when operating in an atmosphere, and a pressured propellant tank when operating outside of an atmosphere. The total thrust produced by system 200 is proportional to the selectable ionization degree of the plasma and the selectable intensity of electric field 203.

Figure 7:
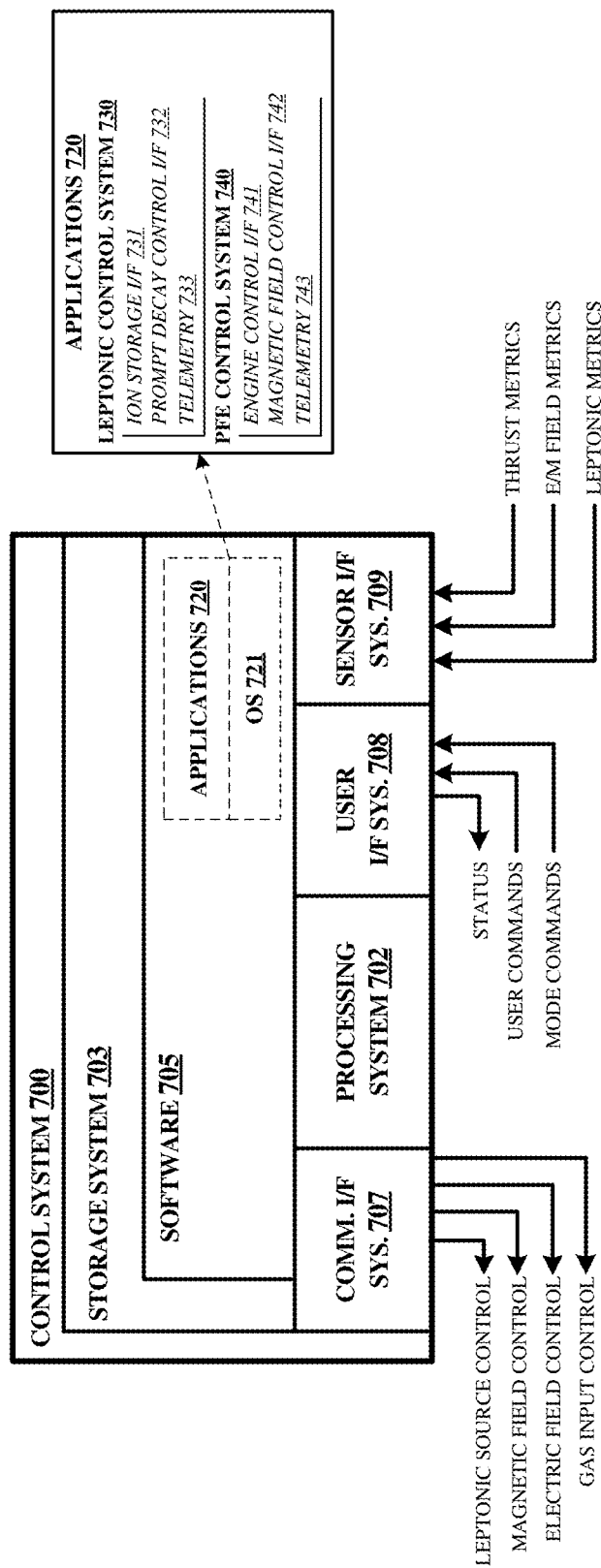
FIG. 7 illustrates a leptonic control system and engine control system in an implementation.

FIG. 7 illustrates control system 700 and associated software 705 in an implementation. FIG. 7 illustrates control system 700 that is representative of any system or collection of systems in which the various operational architectures, scenarios, and processes disclosed herein may be implemented. For example, control system 700 can be used to implement elements of control system 121 and power circuitry 123 of FIG. 1, elements of control circuitry 241 and power circuitry 240 of FIG. 2, or elements of control element 450 of FIG. 4, although variations are possible. In some implementations, two or more control systems similar to that of control system 700 are employed—one for leptonic source control and one for engine control. However, the example in FIG. 7 shows a combined control system having corresponding software-based control elements.

Control system 700 may be implemented as a single apparatus, system, or device or may be implemented in a distributed manner as multiple apparatuses, systems, or devices. Control system 700 includes, but is not limited to, processing system 702, storage system 703, software 705, communication interface system 707, user interface system 708, and sensor interface system 709. Processing system 702 is operatively coupled with storage system 703, communication interface system 707, user interface system 708, and sensor interface system 709.

Processing system 702 loads and executes software 705 from storage system 703. Software 705 includes applications 720, which are representative of the processes, services, and platforms discussed with respect to the included Figures. When executed by processing system 702 to provide control of leptonic power sources and control of plasma fuel engines, among other services, software 705 directs processing system 702 to operate as described herein for at least the various processes, operational scenarios, and sequences discussed in the foregoing implementations. Control system 700 may optionally include additional devices, features, or functionality not discussed for purposes of brevity.

Referring still to FIG. 7, processing system 702 may comprise a micro-processor and processing circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. For example, software 705 may include program instructions comprising applications 721 and operating system 721 that provide control of leptonic power sources and control of plasma fuel engines, among other services. In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software or other application software, in addition to or that include applications 720. Software 705 may also comprise firmware or some other form of machine-readable processing instructions executable by processing system 702.

Software 705, when loaded into processing system 702 and executed, may transform a suitable apparatus, system, or device (of which control system 700 is representative) overall from a general-purpose computing system into a special-purpose computing system customized to provide control of leptonic power sources and control of plasma fuel engines, among other services. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors. For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Applications 720 can include leptonic control system 730 and plasma fuel engine (PFE) control system 740. Leptonic control system 730 includes ion storage interface 731, prompt decay control interface 732, and telemetry 733. Inertial control system 740 includes throttle control interface 741, magnetic field control interface 742, and telemetry 743.

Turning first to leptonic control system 730, ion storage interface 731 is configured to communicate with elements of an ion storage device, such as a confinement ring, ion trap, or magnetic bottle arrangement. Ion storage interface 731 can control ion confinement elements, such as electromagnets, superconducting elements, cooling systems, laser confinement equipment, or other elements that trap and hold ions of a given isotope in a metastable state, unable to proceed through a nuclear decay process. Prompt decay control interface 732 is configured to direct operation of a leptonic source. Prompt decay control interface 732 can indicate or command a leptonic source to release a quantity of isotopic ions toward a target material for generation of beta particles or beam electrons. Control of the release of ions can correspond to a desired energy output of the leptonic source, which can further correspond to a desired thrust of an engine. Meanwhile, telemetry 733 can provide further telemetry related to prompt decay, such as electron beam intensity. Telemetry 733 for communication with telemetry elements or sensor elements of a leptonic source to determine current status or properties of the leptonic source. These properties can include remaining quantity of particles, indicating a remaining energy potential.

Turning now to PFE control system 740, engine control interface 741 receives user input that requests changes in throttle for an associated power source or engine. These user commands can be translated into requests for changes in intensity of electrons produced by a leptonic source. With release of a greater or lesser amount of beam electrons, a corresponding electric field and ionization level of an engine can be controlled to alter thrust levels. Moreover, engine control interface 741 can control input of working fluid into a housing that forms an engine. During atmospheric travel, ingestion of air can be adjusted via engine control interface 741 control of various intake mechanisms. During non-atmospheric travel, such as in space, engine control interface 741 can control pumping or injection of on-board propellant or gas into the engine housing. These two operational regimes can be user-controlled or automatically detected and compensated among, such as using altitude, speed, and attitude or inclination telemetry. Engine control interface 741 can control angles of electron beams introduced into an engine housing to control ionization levels and charge levels on cathodes (and thus an electric field intensity). Engine control interface 741 can also control power circuitry or power systems to provide power to various engine elements that is extracted from the beam electrons or plasma electrons, which may include controlling bias elements positioned between cathodes. Magnetic field control interface 742 is an optional component when a variable magnetic field is employed in a corresponding engine. Magnetic field control interface 742 can alter an orientation or angle of an applied magnetic field used to entrain plasma electrons. This angle can be altered according to the aforementioned operational regimes to adjust among high specific impulse or high thrust modes (including variations thereof). Telemetry 743 can monitor various operational metrics for an engine that employs a leptonic power source, such as the PFE style of engines discussed herein. These metrics include user commands, user controls, operational controls, operational mode commands, thrust metrics, electric field intensity and direction, magnetic field intensity and direction, electron beam intensity, electron beam angle or spread, among other various metrics.

Communication interface system 707 may include communication connections and devices that allow for communication with other computing systems or electrical components (not shown) over communication links or communication networks (not shown). Examples of connections and devices that together allow for inter-system communication may include transceivers, network interface controllers, antennas, power amplifiers, RF circuitry, and other communication circuitry. The connections and devices may communicate over communication media to exchange communications with other computing systems or networks of systems, such as metal, glass, air, or any other suitable communication media. Physical or logical elements of communication interface system 707 can receive link/quality metrics and provide link/quality alerts or telemetry outputs to users or other operators.

Communication interface system 707 may include portions of sensor system interface 709. Sensor system interface 709 comprises various hardware and software elements for interfacing with optical sensors and inertial sensors, such as transceiver equipment. Analog-to-digital conversion equipment, filtering circuitry, data processing elements, or other equipment can be included in sensor system interface 709.

Communication between control system 700 and other elements or systems (not shown), may occur over communication links or communication networks and in accordance with various communication protocols, combinations of protocols, or variations thereof. For example, control system 700 when implementing a control device, might communicate with sensor elements over corresponding digital communication links comprising Ethernet interfaces, serial interfaces, serial peripheral interface (SPI) links, inter-integrated circuit (I2C) interfaces, universal serial bus (USB) interfaces, UART interfaces, or wireless interfaces. When network links are employed, example networks include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some network communication protocols that may be used include, but are not limited to, the Ethernet, Internet protocol (IP, IPv4, IPv6, etc. . . . ), the transmission control protocol (TCP), and the user datagram protocol (UDP), as well as any other suitable communication protocol, variation, or combination thereof.

User interface system 708 may include a software or virtual interface such as a terminal interface, command line interface, or application programming interface (API). User interface system 708 may also include physical user interfaces, such as keyboard, a mouse, a voice input device, or a touchscreen input device for receiving input from a user. User interface system 708 may include thrust control or engine control interfaces, such as throttle control user controls, start/stop controls, operating mode control interfaces, fuel control interfaces, propellant/atmospheric ingestion control interfaces, among others. Output devices such as displays, speakers, web interfaces, terminal interfaces, and other types of output devices may also be included in user interface system 708. User interface system 708 can provide output and receive input over a network interface, such as communication interface system 707. In network examples, user interface system 708 might packetize data for receipt by a display system or computing system coupled over one or more network interfaces. User interface system 708 may comprise API elements for interfacing with users, other data systems, other user devices, web interfaces, and the like. User interface system 708 may also include associated user interface software executable by processing system 702 in support of the various user input and output devices discussed above. Separately or in conjunction with each other and other hardware and software elements, the user interface software and user interface devices may support a console user interface, graphical user interface, a natural user interface, or any other type of user interface.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various isotopes, isomers, nuclear decay processes, materials, and manufacturing processes discussed herein are employed according to the descriptions above. However, it should be understood that the disclosures and enhancements herein are not limited to these isotopes, isomers, nuclear decay processes, materials, and manufacturing processes and can be applicable across a range of suitable selections. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An apparatus, comprising:
   a leptonic source configured to emit beam electrons to ionize a material into a plasma according to a selectable ionization degree and to deposit charge onto a plurality of cathodes in a progressively more negatively charged arrangement to establish an electric field of a selectable intensity in the plasma.

2. The apparatus of claim 1, wherein:
   the leptonic source is configured to hold isotope ions in a state in which electron capture decay is below a threshold probability, release a portion of the isotope ions for prompt electron capture decay to produce gamma radiation for impingement onto a target material and to liberate of the beam electrons from the target material, wherein the portion is selected to achieve the selectable ionization degree of the plasma and the selectable intensity of the electric field.

3. The apparatus of claim 2, wherein the state in which electron capture decay is below the threshold probability comprises a fully ionized state of an isotope capable of electron capture decay.

4. The apparatus of claim 1, wherein the leptonic source comprises a first isotope material that employs electron capture decay for decay into a second isotope material with release of gamma radiation for liberation of the beam electrons from a target material, wherein a rate of the electron capture decay is controlled to produce the selectable ionization degree of the plasma and the selectable intensity of the electric field.

5. The apparatus of claim 4, wherein the first isotope material comprises a beryllium isotope having 4 protons and 3 neutrons, and wherein the second isotope material comprises a lithium isotope having 3 protons and 4 neutrons.

6. The apparatus of claim 1, comprising:
   the leptonic source configured to emit the beam electrons with an angular configuration among the plurality of cathodes that establishes the progressively more negative charged arrangement.

7. The apparatus of claim 1, comprising:
   a housing having apertures through which the material can enter and exit;
   an anode coupled to the housing upstream from the plurality of cathodes;

a magnetic field source configured to produce a magnetic field in the plasma at a selectable angle to a flow of the plasma to at least partially entrain plasma electrons; and wherein ions of the plasma are accelerated downstream in the housing by the electric field and impart momentum to a portion of the material to produce a thrust proportional to the selectable ionization degree of the plasma and the selectable intensity of the electric field.

8. The apparatus of claim 7, comprising:

power circuitry electrically coupled between at least two among the anode and the plurality of cathodes; and wherein the power circuitry is configured to establish the progressively more negative charged arrangement, and provide electrical power to control circuitry configured to control the selectable ionization degree of the plasma and the selectable intensity of the electric field according to a desired thrust level with respect to the housing.

9. The apparatus of claim 7, wherein the magnetic field source comprises an electromagnet device, and wherein the selectable angle is adjustable to select among performance characteristics for the thrust corresponding to a thrust magnitude and a specific impulse magnitude.

10. A method, comprising:

controllably emitting beam electrons from a leptonic source to ionize a material and deposit charge onto a plurality of cathodes in a progressively more negatively charged arrangement to establish an electric field in the material and produce a selectable ionization degree of the material and a selectable intensity of the electric field.

11. The method of claim 10, comprising:

holding isotope ions in a state in which electron capture decay is below a threshold probability; and releasing a portion of the isotope ions for prompt electron capture decay to produce gamma radiation for impingement onto a target material and for liberation of the beam electrons from the target material;

wherein the portion is selected to achieve the selectable ionization degree of the material and the selectable intensity of the electric field.

12. The method of claim 11, wherein the state in which electron capture decay is below the threshold probability comprises a fully ionized state of an isotope capable of electron capture decay.

13. The method of claim 10, wherein the leptonic source comprises a first isotope material that employs electron capture decay for decay into a second isotope material with release of gamma radiation for liberation of the beam electrons from a target material, wherein a rate of the electron capture decay is controlled to produce the selectable ionization degree of the material and the selectable intensity of the electric field.

14. The method of claim 13, wherein the first isotope material comprises a beryllium isotope having 4 protons and 3 neutrons, and wherein the second isotope material comprises a lithium isotope having 3 protons and 4 neutrons.

15. The method of claim 10, comprising:

emitting the beam electrons with an angular configuration among the plurality of cathodes that establishes the progressively more negative charged arrangement.

16. The method of claim 10, comprising:

producing a magnetic field in the material at a selectable angle to a flow of the material to at least partially entrain electrons located in a housing;

accelerating, with the electric field, ions formed in the material to exit the housing and produce a first portion of a thrust on the housing;

imparting momentum, with the ions, to at least a portion of the material to produce a second portion of the thrust; and wherein the thrust is proportional to the selectable ionization degree and the selectable intensity of the electric field.

17. The method of claim 16, wherein:

power circuitry electrically coupled between at least two among the plurality of cathodes and an anode upstream from the plurality of cathodes, establishes the progressively more negative charge arrangement, and provides electrical power to control circuitry configured to control the selectable ionization degree of the material and the selectable intensity of the electric field according to a desired thrust level.

18. The method of claim 16, comprising:

adjusting the selectable angle of the magnetic field to select among performance characteristics for the thrust corresponding to a thrust magnitude and a specific impulse magnitude.

19. A leptonic source, comprising:

a containment structure configured to hold isotope ions in a state in which electron capture decay is below a threshold probability;

a control element configured to selectively induce prompt electron capture decay of a selected portion of the isotope ions to produce gamma radiation for impingement onto a target material and liberation of electrons from the target material; and wherein the target material configured to emit the electrons into a chamber to ionize a gas into a plasma according to a selectable ionization degree and deposit charge onto a plurality of cathodes in a progressively more negatively charged arrangement to establish an electric field of a selectable intensity, wherein the selected portion of the isotope ions is controlled to achieve the selectable ionization degree and the selectable intensity of the electric field.

20. The leptonic source of claim 19, comprising:

a first isotope material that employs the electron capture decay for decay into a second isotope material with release of the gamma radiation for liberation of the beam electrons from the target material; and wherein a rate of the electron capture decay is controlled to produce the selectable ionization degree of the plasma and the selectable intensity of the electric field.

* * * * *